United States Patent
Ono et al.

(10) Patent No.: US 11,409,566 B2
(45) Date of Patent: Aug. 9, 2022

(54) RESOURCE CONTROL DEVICE, RESOURCE CONTROL METHOD, AND COMPUTER READABLE MEDIUM

(71) Applicant: MITSUBISHI ELECTRIC CORPORATION, Tokyo (JP)

(72) Inventors: Yuya Ono, Tokyo (JP); Hirotaka Motai, Tokyo (JP); Masahiro Deguchi, Tokyo (JP); Shinichi Ochiai, Tokyo (JP); Hiroki Konaka, Tokyo (JP); Shunsuke Nishio, Tokyo (JP); Toshiaki Tomisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 222 days.

(21) Appl. No.: 16/963,179

(22) PCT Filed: Feb. 28, 2018

(86) PCT No.: PCT/JP2018/007429
§ 371 (c)(1),
(2) Date: Jul. 17, 2020

(87) PCT Pub. No.: WO2019/167157
PCT Pub. Date: Sep. 6, 2019

(65) Prior Publication Data
US 2021/0132997 A1    May 6, 2021

(51) Int. Cl.
*G06F 9/46*    (2006.01)
*G06F 9/50*    (2006.01)

(52) U.S. Cl.
CPC ............ *G06F 9/5016* (2013.01); *G06F 9/505* (2013.01)

(58) Field of Classification Search
CPC .................................................... G06F 9/5016
See application file for complete search history.

(56) References Cited

U.S. PATENT DOCUMENTS

2014/0359356 A1    12/2014  Aoki
2016/0124672 A1     5/2016  Qiu et al.

FOREIGN PATENT DOCUMENTS

| JP | 2000-293386 A | 10/2000 |
| JP | 2001-331348 A | 11/2001 |
| JP | 2003-91425 A  |  3/2003 |
| JP | 2009-238011 A | 10/2009 |

(Continued)

OTHER PUBLICATIONS

Indian Office Action for Indian Application No. 202047028576, dated Nov. 17, 2021, with English translation.

(Continued)

*Primary Examiner* — Gregory A Kessler
(74) *Attorney, Agent, or Firm* — Birch, Stewart, Kolasch & Birch, LLP (57) ABSTRACT

A process control unit (41) causes a plurality of control-target processes to operate in a memory area of a size equal to or smaller than a limiting value x. When a stopping process is detected, a resource allocation unit (43) allocates a size of a usable memory area for each of the control-target processes as a relaxed limiting value. When the stopping process is detected, the process control unit (41) causes each of the control-target processes to perform fallback operation in a memory area of a size equal to or smaller than the relaxed limiting value allocated to the process by the resource allocation unit (43).

11 Claims, 11 Drawing Sheets

(56) References Cited

FOREIGN PATENT DOCUMENTS

| JP | 2012-168816 A | 9/2012 |
| JP | 2015-109020 A | 6/2015 |
| JP | 2016-538675 A | 12/2016 |

OTHER PUBLICATIONS

"Memory Resource Controller", Control Group v1 (https://www.kernel.org/doc/Documentation/cgroup-v1/memory.txt), total of 15 pages.
Heo, "Control Group v2" (https://www.kernel.org/doc/Documentation/cgroup-v2.txt), Oct. 2015, total of 32 pages.
International Search Report for PCT/JP2018/007429 (PCT/ISA/210) dated May 1, 2018.

| PROCESS | START TIME | DEPENDENCE PROCESS |
|---|---|---|
| PROCESS 1 | 1510284385.789 | — |
| PROCESS 2 | 1510284385.789 | PROCESSES 1, 3 |
| PROCESS 3 | 1510284385.789 | — |
| PROCESS 4 | 1510284385.789 | PROCESSES 3 |

| PROCESS 1 | PROCESS 2 | PROCESS 3 | PROCESS 4 |
|---|---|---|---|
| 409600 | 211220 | 10000000 | 10240 |

| ACQUISITION TIME | PROCESS 1 | PROCESS 2 | PROCESS 3 | PROCESS 4 | RATIO FOR EACH MEMORY USED AMOUNT |
|---|---|---|---|---|---|
| 1510285375.789 | 409600 | 211220 | 10000000 | 10240 | 4:0:0 |
| 1510285375.882 | 420000 | 111220 | 10200000 | 10240 | 1:2:1 |
| ... | ... | ... | ... | ... | ... |

| TIME | OPERATION TYPE | OPERATION DETAIL | RESULT |
|---|---|---|---|
| 1510285375.789 | GROUP GENERATION | group name=A1 | SUCCESS |
| 1510285375.882 | LIMITATION OF RESOURCE | group name=A1, limit=1MB | SUCCESS |
| 1510285375.923 | GROUP SHIFT | pid=1001, group name=A1 | SUCCESS |
| 1510285376.016 | NOTIFICATION | A1, STOP | FAILURE ERROR NUMBER 2 |
| ... | ... | ... | ... |

RESOURCE CONTROL DEVICE, RESOURCE CONTROL METHOD, AND COMPUTER READABLE MEDIUM

TECHNICAL FIELD

The present invention relates to techniques for controlling resources used by processes.

BACKGROUND ART

In conventional resource control, for a process group acquired by grouping, the memory used amount usable by that group is limited. Also, when the memory used amount of the group reaches a limiting value, control of stopping all processes belonging to the group is performed, thereby not affecting other groups.

In Patent Literature 1, it is described that when the remaining amount of the memory used amount runs short in a memory area where resource-control-target processes operate, a process is selected by using a reference value and the selected process is stopped. With this, in Patent Literature 1, the memory is ensured, and influences on other processes by a memory load due to a defective process are eliminated.

CITATION LIST

Patent Literature

Patent Literature 1: JP 2000-293386

SUMMARY OF INVENTION

Technical Problem

In the conventional resource control, it is assumed that the identity of a resource-control-target process has been revealed.

In a system having a process with its function and characteristic not identifiable such as a process developed by a user, it is difficult to classify all resource-control-target processes into specific groups and perform appropriate resource control for each group. In a memory area where the resource-control-target processes operate, if the remaining amount of the usable memory area runs short, it is similarly difficult to determine which process is to be restarted or stopped. Thus, a process related to a service where continuous operation is expected may be restarted or stopped, and there is a possibility of not continuously operating the service.

An object of the present invention is to facilitate continuous operation of a service even if the identity of the resource-control-target process has not been revealed.

A resource control device according to the present invention includes a process control unit to cause a plurality of control-target processes to operate in a memory area of a size equal to or smaller than a limiting value x;

a stop detection unit to detect a stopping process in the plurality of control-target processes; and a resource allocation unit to allocate a size of a usable memory area for each of the control-target processes as a relaxed limiting value when the stopping process is detected by the stop detection unit, wherein when the stopping process is detected by the stop detection unit, the process control unit causes each of the control-target processes to perform fallback operation in a memory area of a size equal to or smaller than the relaxed limiting value allocated to the process by the resource allocation unit.

Solution to Problem

Advantageous Effects of Invention

In this invention, before the remaining amount of the usable memory area runs short, the usable memory area is split and allocated for each process so as to perform fallback operation. With this, while the used amount of the memory area for each process is suppressed, a process without an occurrence of an anomaly can be continuously operated by fallback operation.

DESCRIPTION OF EMBODIMENTS

Embodiment 1

*Description of Configuration*

Figure 1:
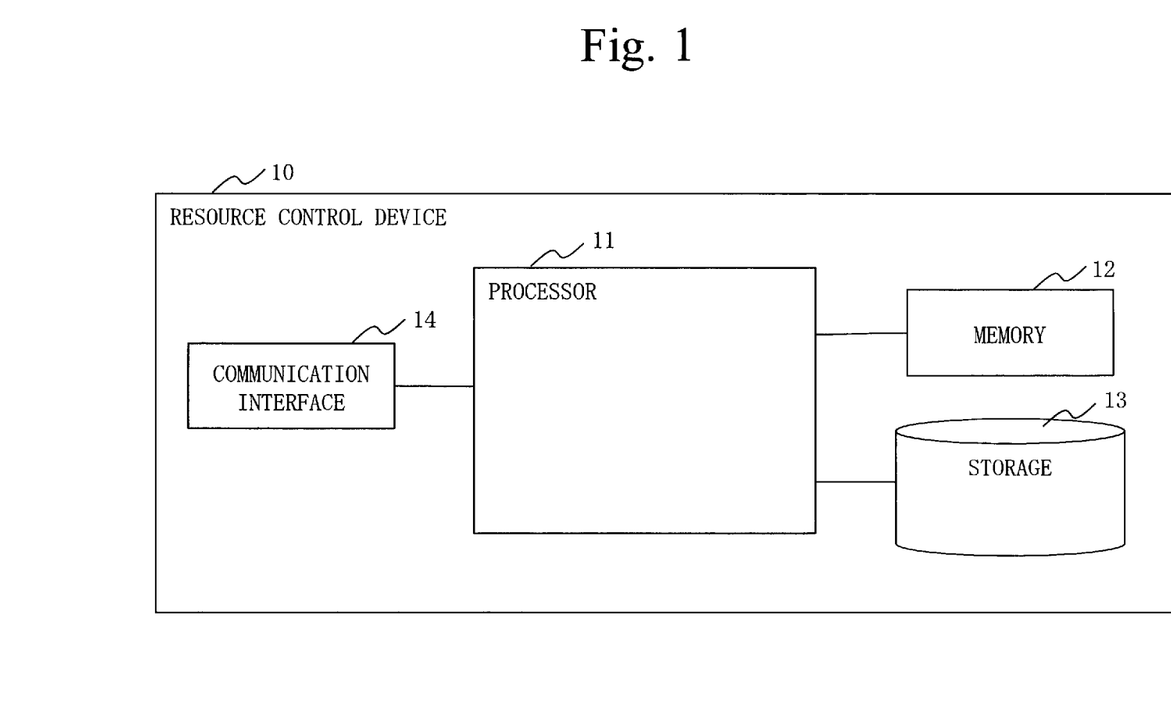
FIG. 1 is a hardware configuration diagram of a resource control device 10 according to Embodiment 1.

With reference to FIG. 1, a hardware configuration of a resource control device 10 according to Embodiment 1 is described.

The resource control device 10 includes hardware of a processor 11, a memory 12, a storage 13, and a communication interface 14. The processor 11 is connected to other pieces of hardware via signal lines to control these other pieces of hardware.

The processor 11 is an IC (Integrated Circuit) which performs processing. That is, the processor 11 is processing circuitry. Specific examples of the processor 11 are a CPU (Central Processing Unit), DSP (Digital Signal Processor), and GPU (Graphics Processing Unit).

The memory 12 is a storage device which temporarily stores data. Specific examples of the memory 12 are an SRAM (Static Random Access Memory) and DRAM (Dynamic Random Access Memory).

The storage 13 is a storage device which stores data. A specific example of the storage 13 is an HDD (Hard Disk Drive). Also, the storage 13 may be a portable storage medium such as an SD (registered trademark, Secure Digital) memory card, CF (CompactFlash, registered trademark), NAND flash, flexible disc, optical disc, compact disc, Blu-ray (registered trademark) disc, or DVD (Digital Versatile Disk).

The communication interface 14 is an interface for communicating with external devices. Specific examples of the communication interface 14 are ports of Ethernet (registered trademark), USB (Universal Serial Bus), and HDMI (registered trademark, High-Definition Multimedia Interface).

In FIG. 1, only one processor 11 is illustrated. However, a plurality of processors 11 may be provided.

Figure 2:
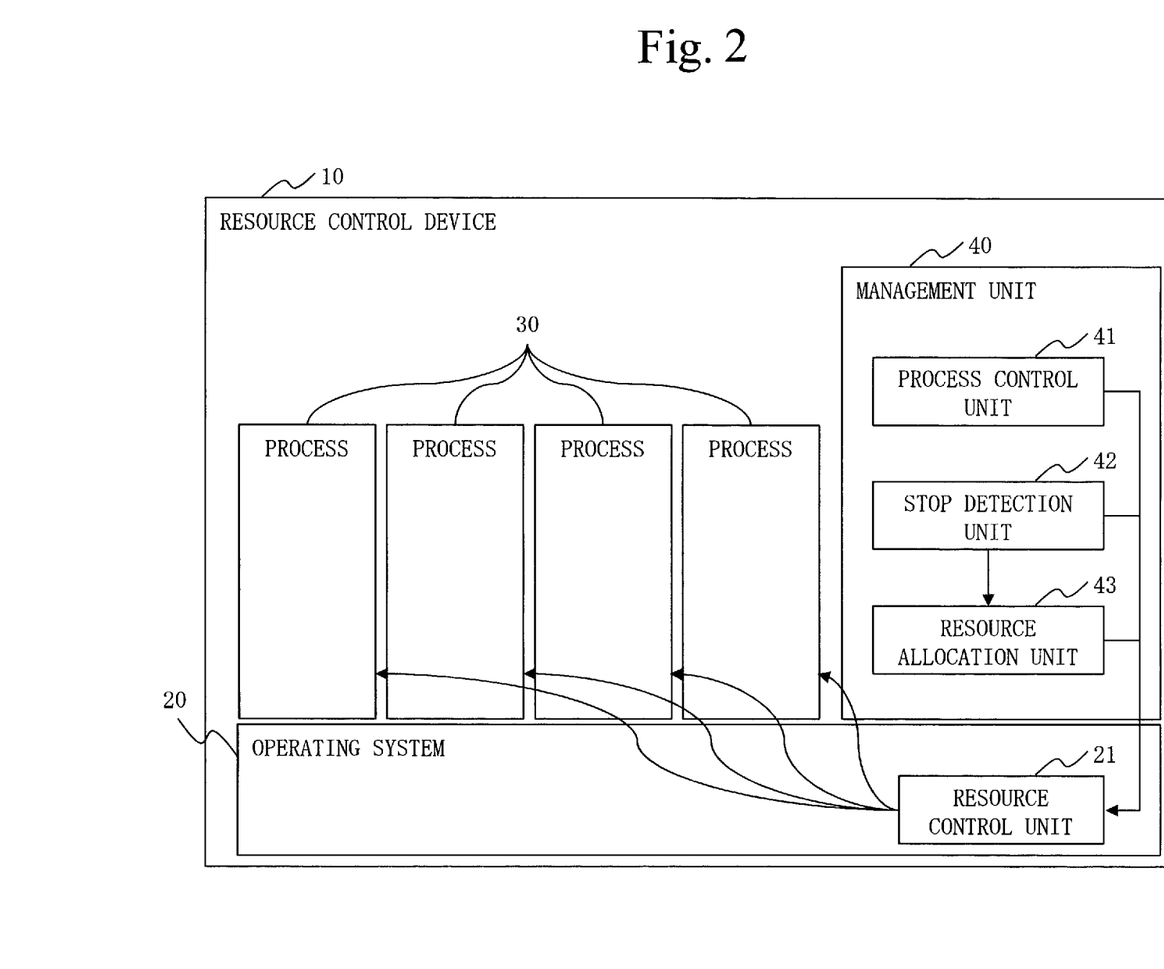
FIG. 2 is a software configuration diagram of the resource control device 10 according to Embodiment 1.

With reference to FIG. 2, a software configuration of the resource control device 10 according to Embodiment 1 is described.

In the resource control device 10, an operating system 20 operates. On the operating system 20, a plurality of processes 30 and a management unit 40 operate. While four processes 30 are illustrated in FIG. 2, the number of processes 30 may be two, three, five, or more.

The operating system 20 includes a resource control unit 21 as a functional component.

The resource control unit 21 is an interface for performing, for resource-control-target processes 30, group generation, group deletion, registration of any process 30 in a group, change of the group to which the process 30 belongs, limitation of a memory used amount, and collection of memory used amounts.

The management unit 40 includes a process control unit 41, a stop detection unit 42, and a resource allocation unit 43 as functional components.

The process control unit 41 requests the resource control unit 21 to perform, for example, processing regarding groups, such as generation of a group of processes. The stop detection unit 42 detects a stopping process 30 in the plurality of the resource-control-target processes 30. The resource allocation unit 43 allocates a size of a usable memory area for each of the control-target processes 30.

*Description of Operation*

With reference to FIG. 3 to FIG. 6, the operation of the resource control device 10 according to Embodiment 1 is described.

The operation of the resource control device 10 according to Embodiment 1 corresponds to a resource control method according to Embodiment 1. Also, the operation of the resource control device 10 according to Embodiment 1 corresponds to processing of a resource control program according to Embodiment 1.

Figure 3:
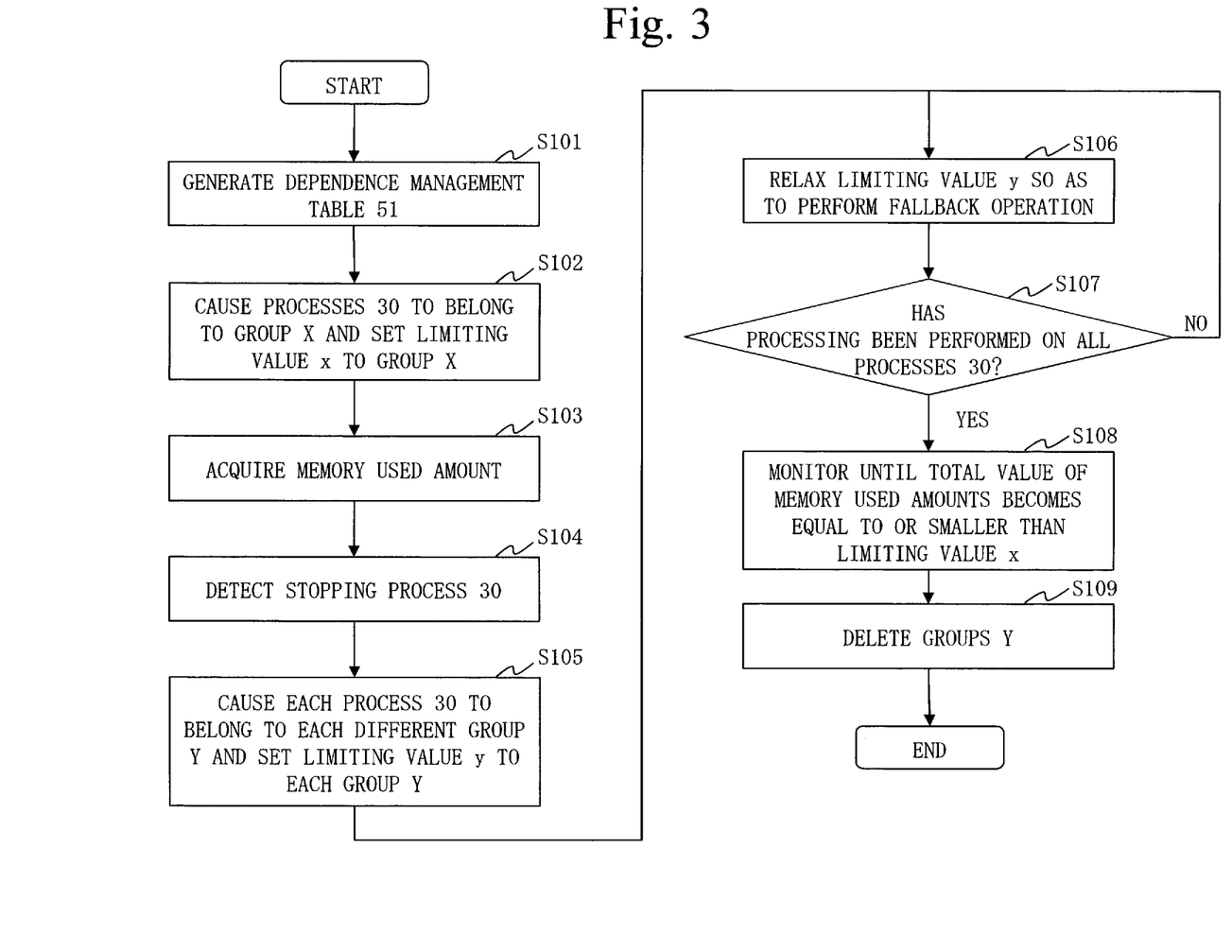
FIG. 3 is a flowchart illustrating entire operation of the resource control device 10 according to Embodiment 1.

With reference to FIG. 3, entire operation of the resource control device 10 according to Embodiment 1 is described.

(Step S101: Table Generation Processing)

The process control unit 41 generates a dependence management table 51 for managing a plurality of resource-control-target processes 30. The process control unit 41 writes the dependence management table 51 in the storage 13.

Figure 4:
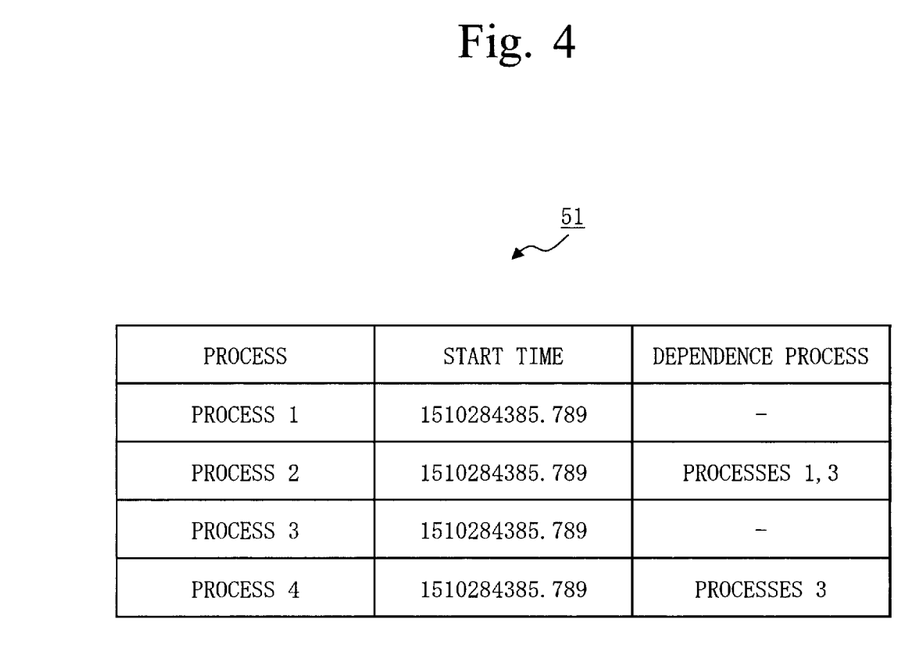
FIG. 4 is a diagram illustrating a dependence management table 51 according to Embodiment 1.

As illustrated in FIG. 4, the dependence management table 51 stores a start time and a dependence process for each process 30. The start time is a time in form that allows mutual comparison operation to be performed and an absolute time to be grasped. A specific example of the start time is UNIX (registered trademark) time. The dependence process is a process 30 required for the target process 30 to operate. That is, if the dependence process does not operate, the target process 30 cannot operate. For example, in the case of Linux (registered trademark), the dependence process is a parent process of the target process 30.

(Step S102: Group X Generation Processing)

The process control unit 41 generates a group X via the resource control unit 21, and causes the plurality of resource-control-target processes 30 to belong to the group X.

The resource allocation unit 43 sets, via the resource control unit 21, a limiting value x, which is a limiting value of the used amount of the memory 12, to the group X. The limiting value x indicates a size smaller than the size of a memory area usable by the group X. In Embodiment 1, the limiting value x indicates a size obtained by multiplying the size of the memory area usable by the group X by a value α (for example, 0.95) smaller than 1.

(Step S103: Used Amount Acquisition Processing)

Figure 5:
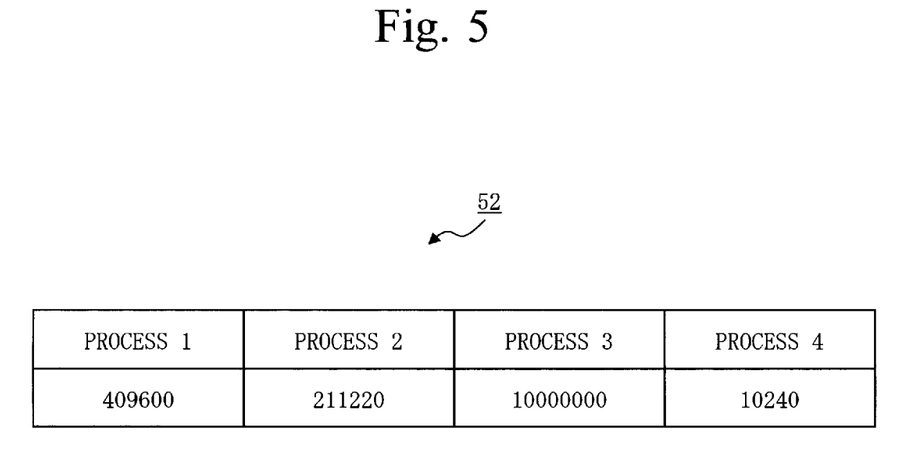
FIG. 5 is a diagram illustrating a used amount management table 52 according to Embodiment 1.

The process control unit 41 acquires, via the resource control unit 21, a memory used amount, which indicates the size of a memory area being used by each process 30. As illustrated in FIG. 5, the process control unit 41 generates a used amount management table 52 indicating a memory used amount. The process control unit 41 writes the used amount management table 52 in the storage 13.

(Step S104: Stop Detection Processing)

The stop detection unit 42 detects, via the resource control unit 21, a stopping process 30 in the plurality of resource-control-target processes 30. That is, the stop detection unit 42 detects a stopping process 30 in the plurality of processes 30 belonging to the group X.

When the stopping process 30 is detected, the stop detection unit 42 causes the processing to proceed to step S105. On the other hand, when the stopping process 30 is not detected, the stop detection unit 42 returns the processing to step S103 to acquire the memory used amount again after a lapse of a certain time.

(Step S105: Group Y Generation Processing)

The process control unit 41 generates, via the resource control unit 21, groups Y as many as the number of processes 30 belonging to the group X, and causes each process 30 to belong to each different group Y. That is, one group Y has one process 30 belonging thereto.

The resource allocation unit 43 takes each group Y as a target and sets a limiting value y, which is a limiting value of the used amount of the memory area, to the target group Y. In other words, the resource allocation unit 43 allocates, for each process 30, a size of a usable memory area as the limiting value y. The limiting value y indicates the size of the memory used by the process 30 belonging to the target group Y when the stopping process 30 is detected at step S104. That is, the limiting value y indicates the size of the memory area used by the process 30 belonging to the target group Y acquired at the preceding step S103.

If each process 30 is shifted to each group Y, the size of the memory area usable by the stopping process 30 has the same limiting value y as the size being used at the time of stopping, and the stopping process 30 thus remains stopping.

(Step S106: Fallback Operation Processing)

The process control unit 41 selects one group from the plurality of groups Y. The process control unit 41 relaxes the limiting value y of the selected group Y via the resource control unit 21, and then causes the process 30 belonging to the selected group Y to perform fallback operation. For example, via inter-process communication such as a signal or message queue or by using a shared memory, the process control unit 41 transmits, to the process 30 belonging to the selected group Y, a notification that the process 30 has stopped. Upon receiving the notification, the process 30 assumes that a memory shortage has occurred, and makes a transition to fallback operation.

That is, the process control unit 41 allocates, to the selected group Y, a relaxed limiting value, which indicates a size larger than the limiting value y. The relaxed limiting value indicates a size larger than the size of the memory area used by the process 30 belonging to the target group Y acquired at the preceding step S103. In Embodiment 1, the relaxed limiting value indicates a size obtained by multiplying the size of the memory area used by the process 30 belonging to the target group Y acquired at the preceding step S103 by an inverse of the value α (that is, 1/α).

The fallback operation is an operation mode of operating only with a minimum function without operating any unnecessary function.

Here, with reference to the dependence management table 51, if a process 30 having a dependence process is present, the process control unit 41 selects the dependence process with the first priority. Also, the process control unit 41 selects a process 30 with a large memory used amount acquired at the preceding step S103 with the second priority. That is, if a plurality of dependence processes are present, the process control unit 41 selects a dependence process with a large memory used amount with a high priority.

Since the limiting value y is relaxed, restarting the operation of the process 30 stopping due to a memory shortage may be enabled.

(Step S107: Relaxation Determination Processing)

The process control unit 41 determines whether the processing at step S106 has been performed on the processes 30 belonging to all of the groups Y.

If performed, the process control unit 41 causes the processing to proceed to step S108. On the other hand, if not performed, the process control unit 41 returns the processing to step S106 to select a group Y on which the processing has not yet been performed.

(Step S108: Group Monitoring Processing)

The process control unit 41 performs monitoring until the total value of the sizes of the memory areas used by the processes 30 belonging to all of the groups Y becomes equal to or smaller than the limiting value x set at step S102.

(Step S109: Group Y Deletion Processing)

The process control unit 41 deletes all groups Y which become unnecessary as it is confirmed at step S108 that the total value is equal to or smaller than the limiting value x.

Figure 6:
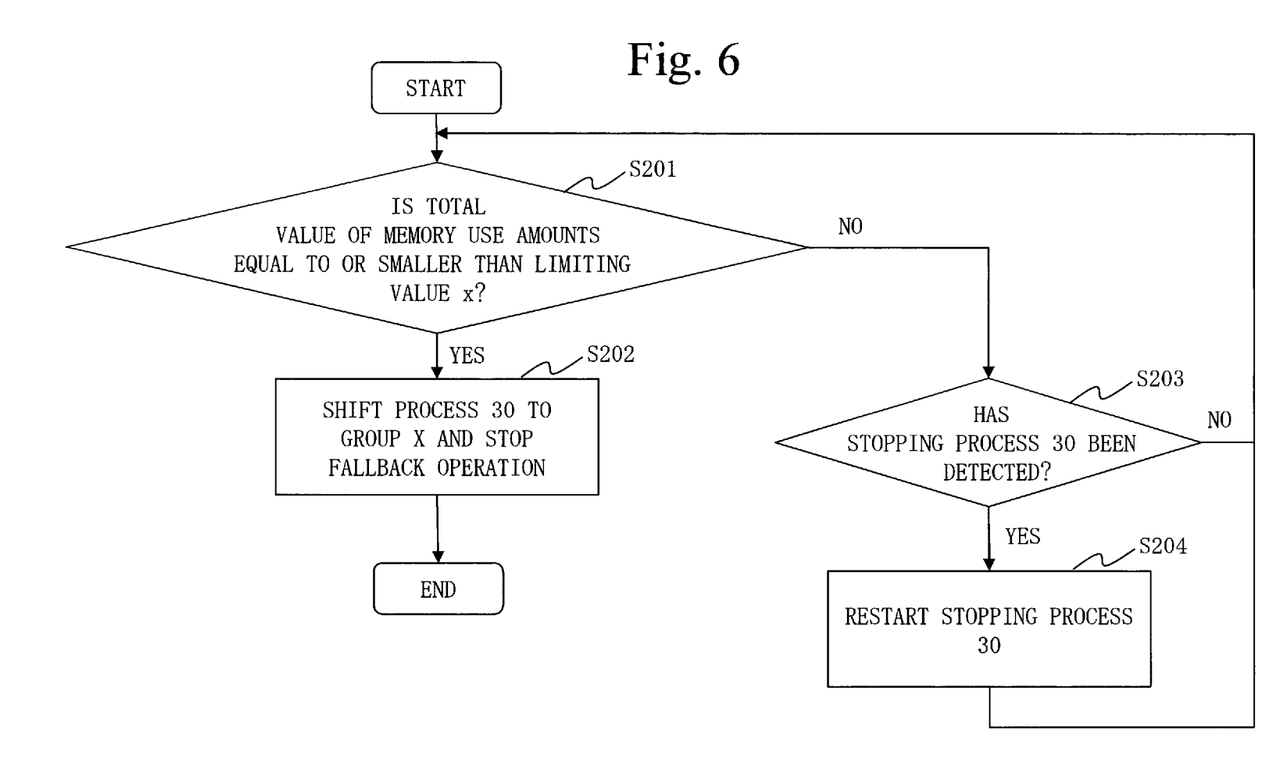
FIG. 6 is a flowchart of group monitoring processing according to Embodiment 1.

With reference to FIG. 6, group monitoring processing (step S108) according to Embodiment 1 is described.

(Step S201: Used Amount Determination Processing)

The process control unit 41 acquires, via the resource control unit 21, a memory used amount, which indicates a size of a memory area used by the processes 30 belonging to all of the groups Y. Then, the process control unit 41 determines whether the total value of the sizes of the memory areas used by the processes 30 belonging to all of the groups Y becomes equal to or smaller than the limiting value x set at step S102.

When the total value is equal to or smaller than the limiting value x, the process control unit 41 causes the processing to proceed to step S202. On the other hand, when the total value is larger than the limiting value x, it causes the processing to proceed to step S203.

(Step S202: Recovery Processing)

The process control unit 41 shifts, via the resource control unit 21, the processes 30 belonging to all of the groups Y to the group X. Then, the process control unit 41 notifies each process 30 that a memory shortage has been resolved, and causes each process 30 to operate not in fallback operation but normal operation.

(Step S203: Stop Determination Processing)

The stop detection unit 42 detects a stopping process 30 in the processes 30 belonging to all groups Y.

When the stopping process 30 is detected, the stop detection unit 42 causes the processing to proceed to step S204. On the other hand, when the stopping process 30 is not detected, the stop detection unit 42 returns the processing to step S201 to acquire a memory used amount again after a lapse of a certain time.

(Step S204: Restart Processing)

The process control unit 41 restarts, via the resource control unit 21, the stopping process 30 detected at step S203. Then, the process control unit 41 returns the processing to step S201 to acquire a memory used amount again after a lapse of a certain time.

Effects of Embodiment 1

As described above, the resource control device 10 according to Embodiment 1 splits and allocates the usable memory area for each process 30 before the remaining amount of the usable memory area runs short, and causes each process 30 to perform fallback operation. With this, the process 30 unrelated to the process 30 with its used amount of the memory area abnormally increased can be continuously operated by fallback operation, while the used amount of the memory area of each process 30 is suppressed. Also, as for the process 30 where an anomaly has occurred, a large size of the usable memory area is allocated, thereby allowing operation to restart.

With the process 30 continuously operated, system availability is improved. Also, it is not required in advance to set a threshold and measures for each process 30, so that introduction is easy.

Embodiment 2

Embodiment 2 is different from Embodiment 1 in that the size of a memory area used by each process 30 is outputted as log data. In Embodiment 2, this different point is described, and description of the same points is omitted.

*Description of Configuration*

Figure 7:
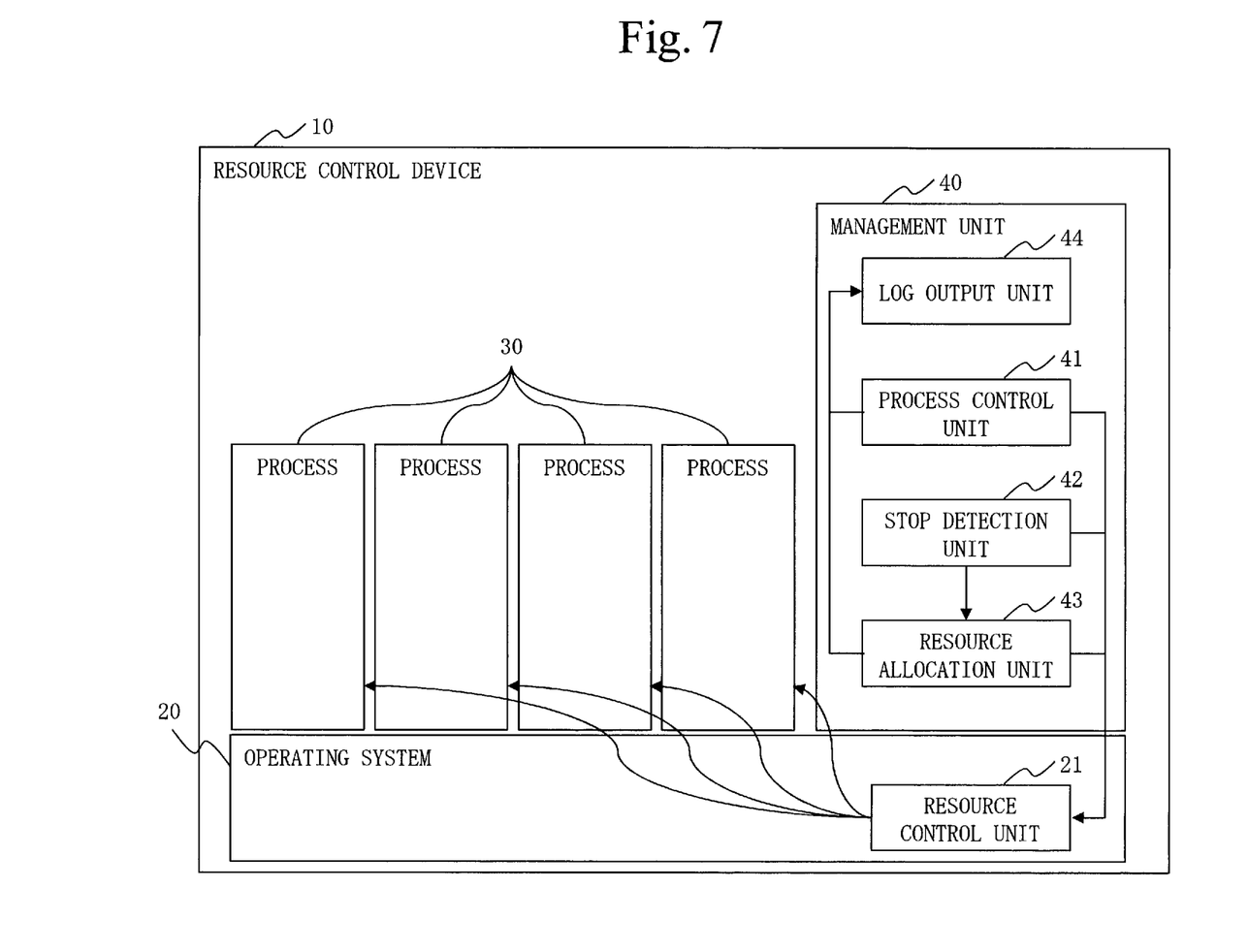
FIG. 7 is a software configuration diagram of a resource control device 10 according to Embodiment 2.

With reference to FIG. 7, a software configuration of the resource control device 10 according to Embodiment 2 is described.

The resource control device 10 is different from the resource control device 10 illustrated in FIG. 2 in that the management unit 40 includes a log output unit 44.

*Description of Operation*

With reference to FIG. 3, FIG. 6, FIG. 8, and FIG. 9, the operation of the resource control device 10 according to Embodiment 2 is described.

The operation of the resource control device 10 according to Embodiment 2 corresponds to a resource control method according to Embodiment 2. Also, the operation of the resource control device 10 according to Embodiment 2 corresponds to processing of a resource control program according to Embodiment 2.

At step S103 of FIG. 3 and step S201 of FIG. 6, the log output unit 44 outputs the acquired memory used amount as log data.

Figure 8:
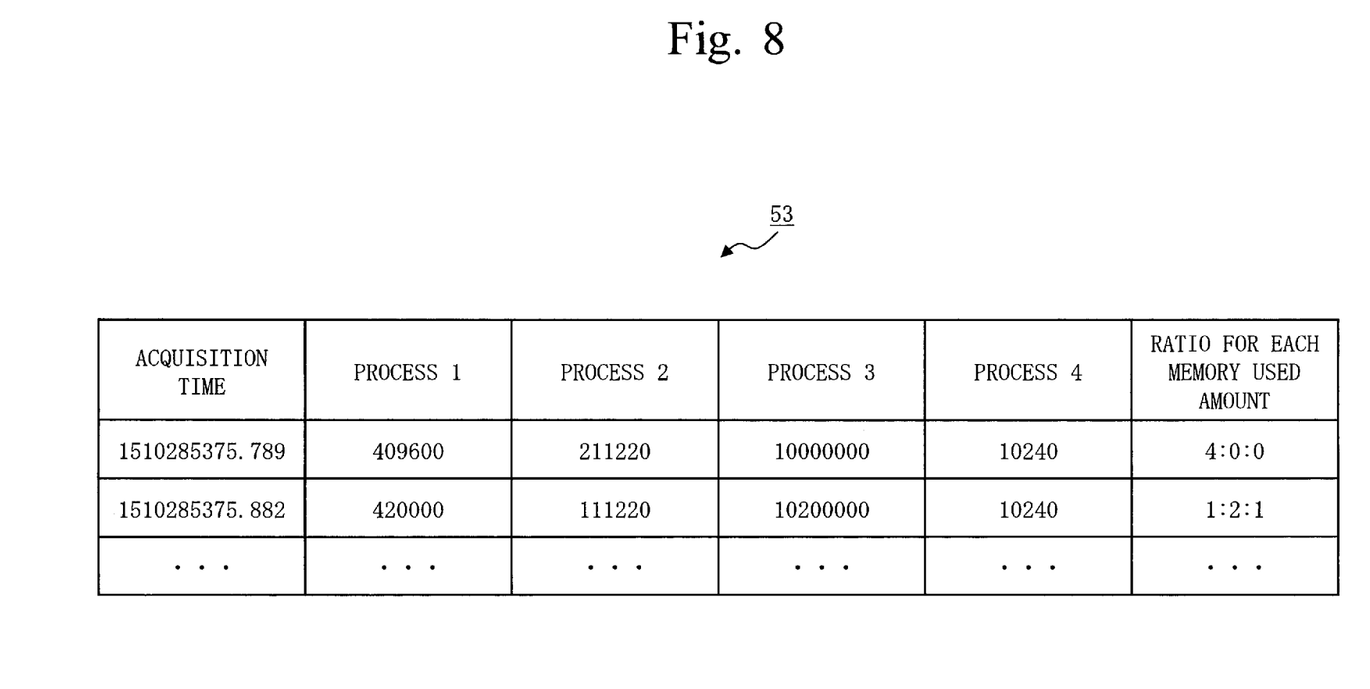
FIG. 8 is a diagram illustrating a used amount log table 53 according to Embodiment 2.

In Embodiment 2, as illustrated in FIG. 8, the log output unit 44 additionally writes the acquired memory used amount to a used amount log table 53. In FIG. 8, the used amount log table 53 stores, for each acquisition time, a memory used amount of each process 30 and a ratio for each memory used amount. The memory used amount is classified into three levels, A1, A2, and A3, and the ratio for each memory used amount represents the number of processes 30 with the memory used amount relevant to each level. That is, for a record on the first row in FIG. 8, the ratio for each memory used amount is 4:0:0, representing that the number of processes 30 relevant to the level A1 is four and the number of processes 30 relevant to the levels A2 and A3 is zero. Here, the level A1 represents a case in which the memory used amount is equal to or smaller than the limiting value y. The level A2 represents a case in which the memory used amount is larger than the limiting value y and equal to or smaller than the relaxed limiting value. The level A3 represents a case in which the memory used amount is larger than the relaxed limiting value.

At step S102, step S105, and step S106 of FIG. 3 and step S202, step S203, and step S204 of FIG. 6, the log output unit 44 outputs the performed operation as log data. Note that the log output unit 44 may output log data a plurality of times at each step.

Figure 9:
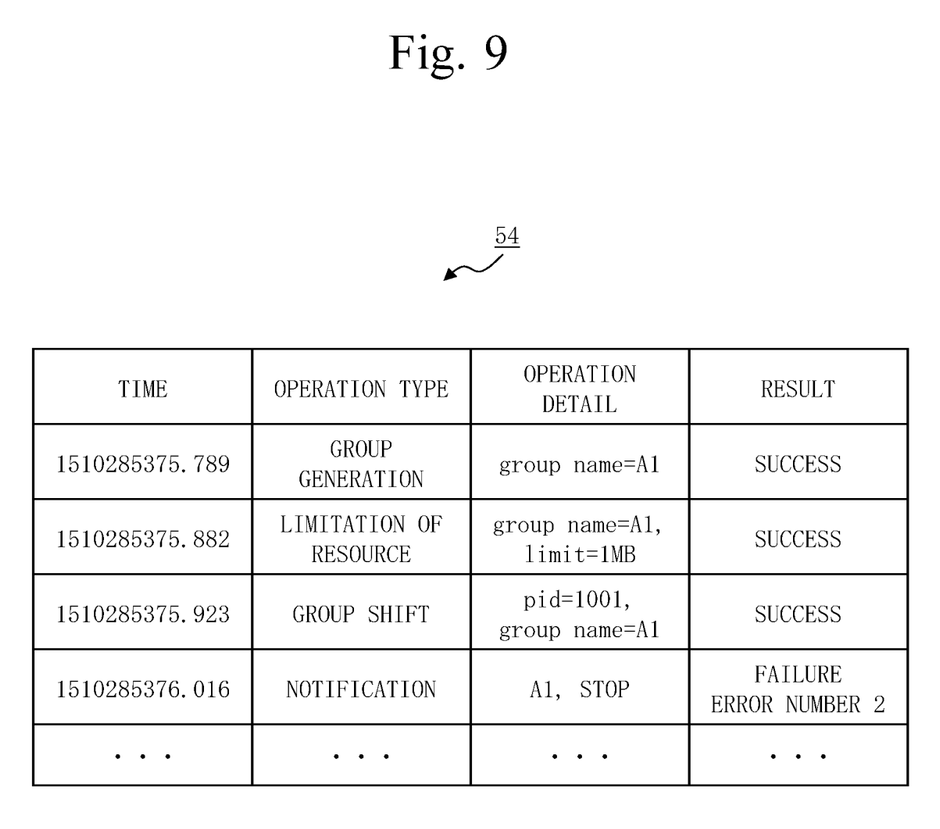
FIG. 9 is a diagram illustrating an operation history table 54 according to Embodiment 2.

In Embodiment 2, as illustrated in FIG. 9, the log output unit 44 additionally writes the performed operation to an operation history table 54. In FIG. 9, the operation history table 54 stores, for each time, an operation type, an operation detail, and a result. The operation type is a classification of the performed operation. The operation type includes group generation, group deletion, registration of any process 30 in a group, a change of the group to which the process 30 belongs, limitation of a memory used amount, collection of the memory used amounts, notification, restart, and so forth. The operation detail is a specific detail of the performed operation. The result indicates whether the performed operation has been successful or failed. The result is the result of a request to the operating system 20 and the resource control unit 21. Note that the result may include an error number indicating a cause when the operation has failed.

Effects of Embodiment 2

As described above, the resource control device 10 according to Embodiment 2 outputs the memory used amount and the performed operation at each point in time as log data. With this, if a memory shortage occurs, it is possible to identify whether the cause is ascribed to the process 30 or the environment, and so forth. It is also possible to analyze the level of a failure.

Embodiment 3

Embodiment 3 is different from Embodiments 1 and 2 in that a garbage collector is prioritized to start fallback operation. In Embodiment 3, this different point is described, and description of the same points is omitted.

In Embodiment 3, a case in which functions are added to Embodiment 1 is described, but it is possible to add functions to Embodiment 2.

*Description of Configuration*

Figure 10:
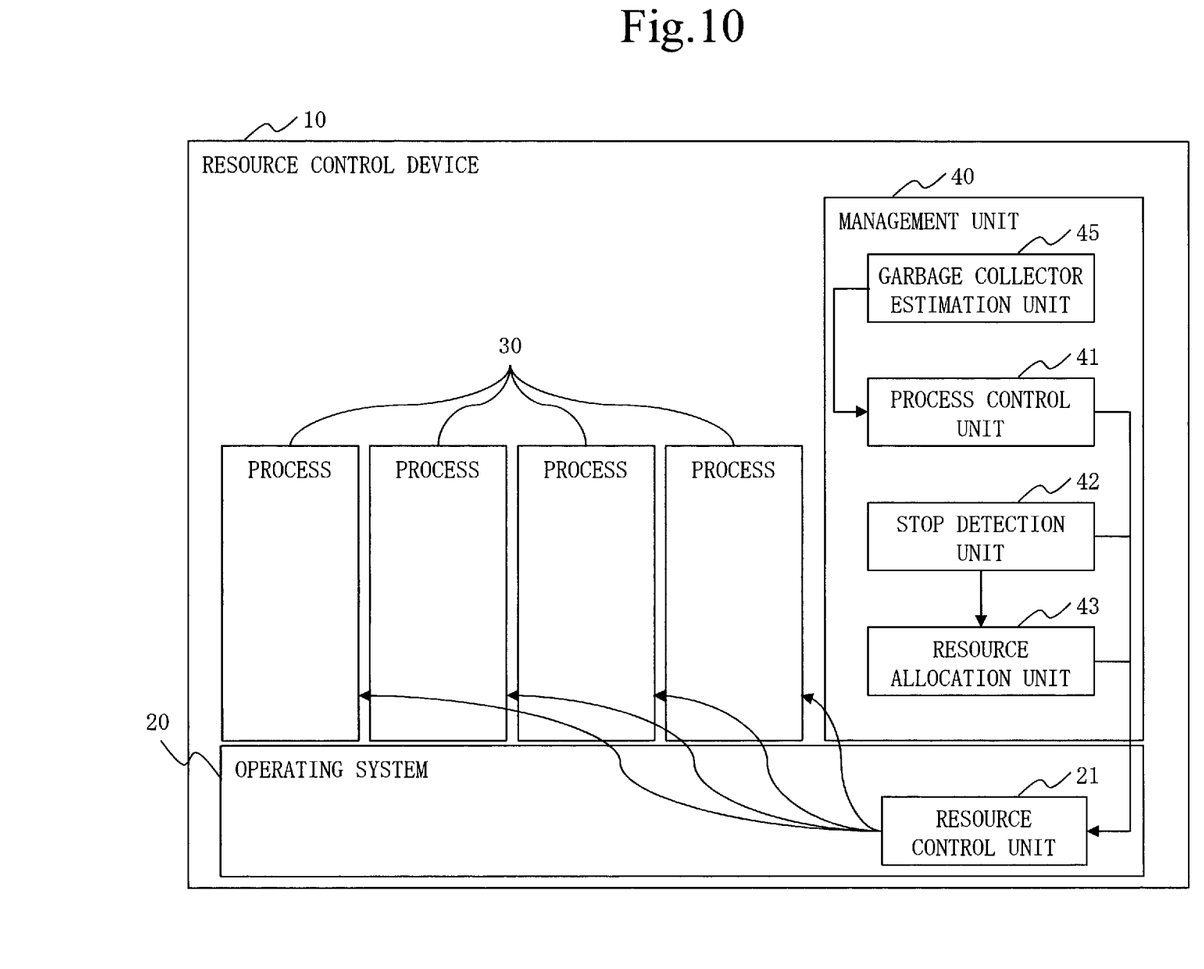
FIG. 10 is a software configuration diagram of a resource control device 10 according to Embodiment 3.

With reference to FIG. 10, a software configuration of the resource control device 10 according to Embodiment 3 is described.

The resource control device 10 is different from the resource control device 10 illustrated in FIG. 2 in including a garbage collector estimation unit 45.

*Description of Operation*

Figure 11:
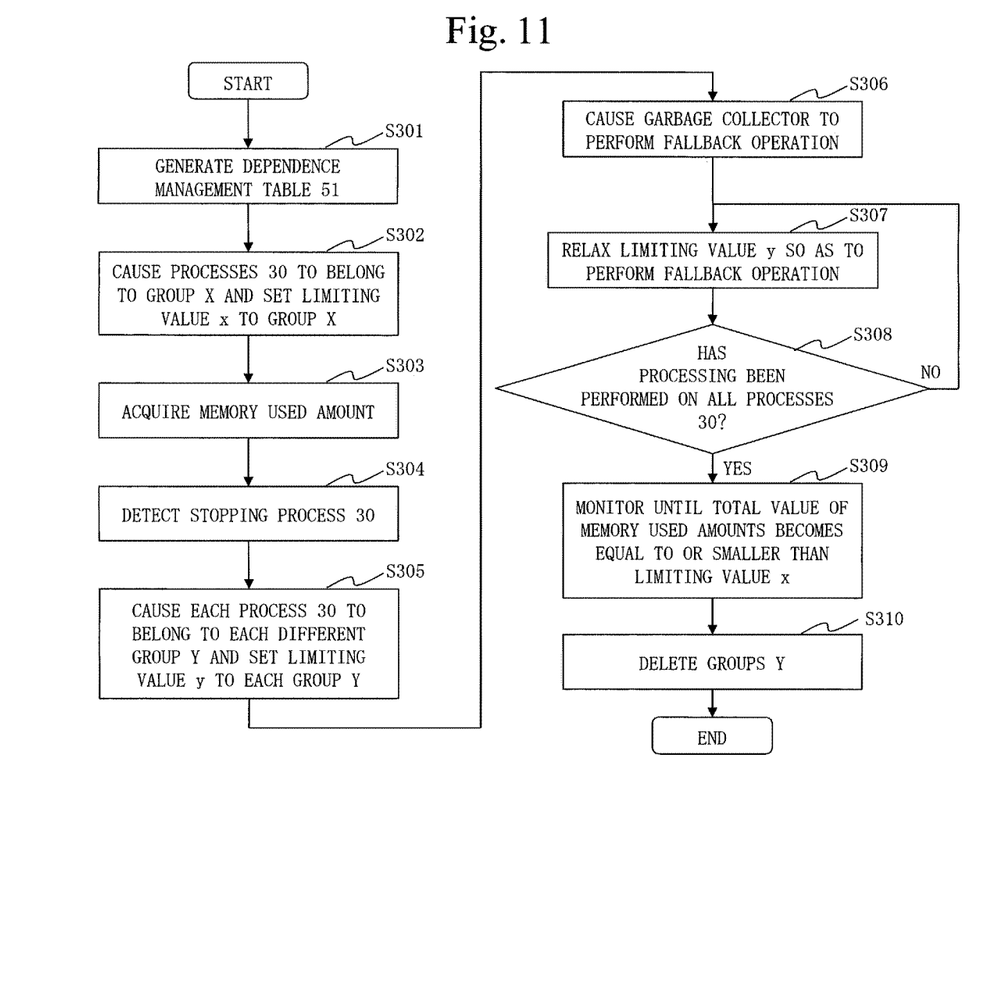
FIG. 11 is a flowchart illustrating operation of the resource control device 10 according to Embodiment 3.

With reference to FIG. 11, the operation of the resource control device 10 according to Embodiment 3 is described.

The operation of the resource control device 10 according to Embodiment 3 corresponds to a resource control method according to Embodiment 3. Also, the operation of the resource control device 10 according to Embodiment 3 corresponds to processing of a resource control program according to Embodiment 3.

Processing from step S301 to step S305 is identical to processing from step S101 to step S105 of FIG. 3. Processing from step S308 to step S310 is identical to processing from step S107 to step S109 of FIG. 3.

(Step S306: Garbage Collector Estimation Processing)

The garbage collector estimation unit 45 estimates a garbage collector among all processes 30 belonging to the groups Y. Specifically, with reference to the dependence management table 51, the garbage collector estimation unit 45 estimates a process 30 with the earliest start time as a garbage collector.

The process control unit 41 relaxes the limiting value y of the group Y to which the process 30 as a garbage collector belongs, and then causes the process 30 as a garbage collector to perform fallback operation.

The process control unit 41 causes the processing to proceed to step S307 when the process control unit 41 receives a notification that the operation of the garbage collector is completed or the garbage collector is not operated or when the process 30 caused to perform fallback operation stops.

(Step S307: Fallback Operation Processing)

The process control unit 41 selects one group from the groups Y other than the group Y to which the process 30 caused to perform fallback operation at step S306 belongs. Then, the process control unit 41 relaxes the limiting value y of the selected group Y via the resource control unit 21, and then causes the process 30 belonging to the selected group Y to perform fallback operation.

Effects of Embodiment 3

As described above, the resource control device 10 according to Embodiment 3 estimates a process 30 as a garbage collector, and causes the process 30 as a garbage collector to be prioritized to perform fallback operation. If the garbage collector is executed, the memory is freed to resolve a memory shortage. Thus, by operating the process 30 as a garbage collector with a high priority, it is possible to resolve a memory shortage early.

REFERENCE SIGNS LIST

10: resource control device; 11: processor; 12: memory; 13: storage; 14: communication interface; 20: operating system; 21: resource control unit; 30: process; 40: management unit; 41: process control unit; 42: stop detection unit; 43: resource allocation unit; 44: log output unit; 45: garbage collector estimation unit

The invention claimed is:
1. A resource control device comprising:
processing circuitry to:
cause a plurality of control-target processes to operate in a memory area of a size equal to or smaller than a limiting value x;
detect a stopping process in the plurality of control-target processes; and
allocate a size of a usable memory area for each of the control-target processes as a relaxed limiting value when the stopping process is detected, wherein
when the stopping process is detected, the processing circuitry causes each of the control-target processes to perform fallback operation in a memory area of a size equal to or smaller than the relaxed limiting value allocated to the process.

2. The resource control device according to claim 1, wherein
the limiting value x indicates a size smaller than the size of the usable memory area, and
the processing circuitry takes each of the control-target processes as a target process and allocates, as the relaxed limiting value, a size larger than a size of a memory area used by the target process when the stopping process is detected.

3. The resource control device according to claim 2, wherein
the limiting value x indicates a size obtained by multiplying the size of the usable memory area by a value α smaller than 1, and
the processing circuitry allocates, as the relaxed limiting value, a size obtained by multiplying the size of the memory area used by the target process by an inverse of the value α.

4. The resource control device according to claim 1, wherein
when a dependence process, which is a process required for another process to operate, is present, the processing circuitry causes the dependence process to be prioritized to perform fallback operation in a memory area of a size equal to or smaller than the relaxed limiting value.

5. The resource control device according to claim 1, wherein
the processing circuitry causes a process using a memory area of a large size to be prioritized to perform fallback operation in the memory area of the size equal to or smaller than the relaxed limiting value.

6. The resource control device according to claim 1, wherein
when each of the processes is caused to perform fallback operation in the memory area of the size equal to or smaller than the relaxed limiting value, if the stopping process becomes undetected in the plurality of control-target processes, the processing circuitry causes the plurality of control-target processes to operate in the memory area of the size equal to or smaller than the limiting value x.

7. The resource control device according to claim 1, wherein
the processing circuitry outputs log data indicating at least either of a size of a memory area used by each of the processes and executed processing.

8. The resource control device according to claim 1, wherein
the processing circuitry causes a process as a garbage collector to be prioritized to perform fallback operation in the memory area of the size equal to or smaller than the relaxed limiting value.

9. The resource control device according to claim 8, wherein
the processing circuitry estimates the process as the garbage collector based on a start time of each of the processes, and
causes a process estimated as the process as the garbage collector to be prioritized to perform fallback operation in the memory area of the size equal to or smaller than the relaxed limiting value.

10. A resource control method comprising:
causing a plurality of control-target processes to operate in a memory area of a size equal to or smaller than a limiting value x;
detecting a stopping process in the plurality of control-target processes;
allocating a size of a usable memory area for each of the control-target processes as a relaxed limiting value when the stopping process is detected; and
when the stopping process is detected causing each of the control-target processes to perform fallback operation in a memory area of a size equal to or smaller than the relaxed limiting value allocated to the process.

11. A non-transitory computer readable medium storing a resource control program comprising:
process control processing of causing a plurality of control-target processes to operate in a memory area of a size equal to or smaller than a limiting value x;
stop detection processing of detecting a stopping process in the plurality of control-target processes;
resource allocation processing of allocating a size of a usable memory area for each of the control-target processes as a relaxed limiting value when the stopping process is detected by the stop detection processing, wherein
in the process control processing, when the stopping process is detected by the stop detection processing, each of the control-target processes is caused to perform fallback operation in a memory area of a size equal to or smaller than the relaxed limiting value allocated to the process by the resource allocation processing.

* * * * *